March 1, 1949.  M. F. REAGAN  2,463,202
DATE BUNCH SPREADER AND INSERTER
Filed June 12, 1946  2 Sheets-Sheet 2
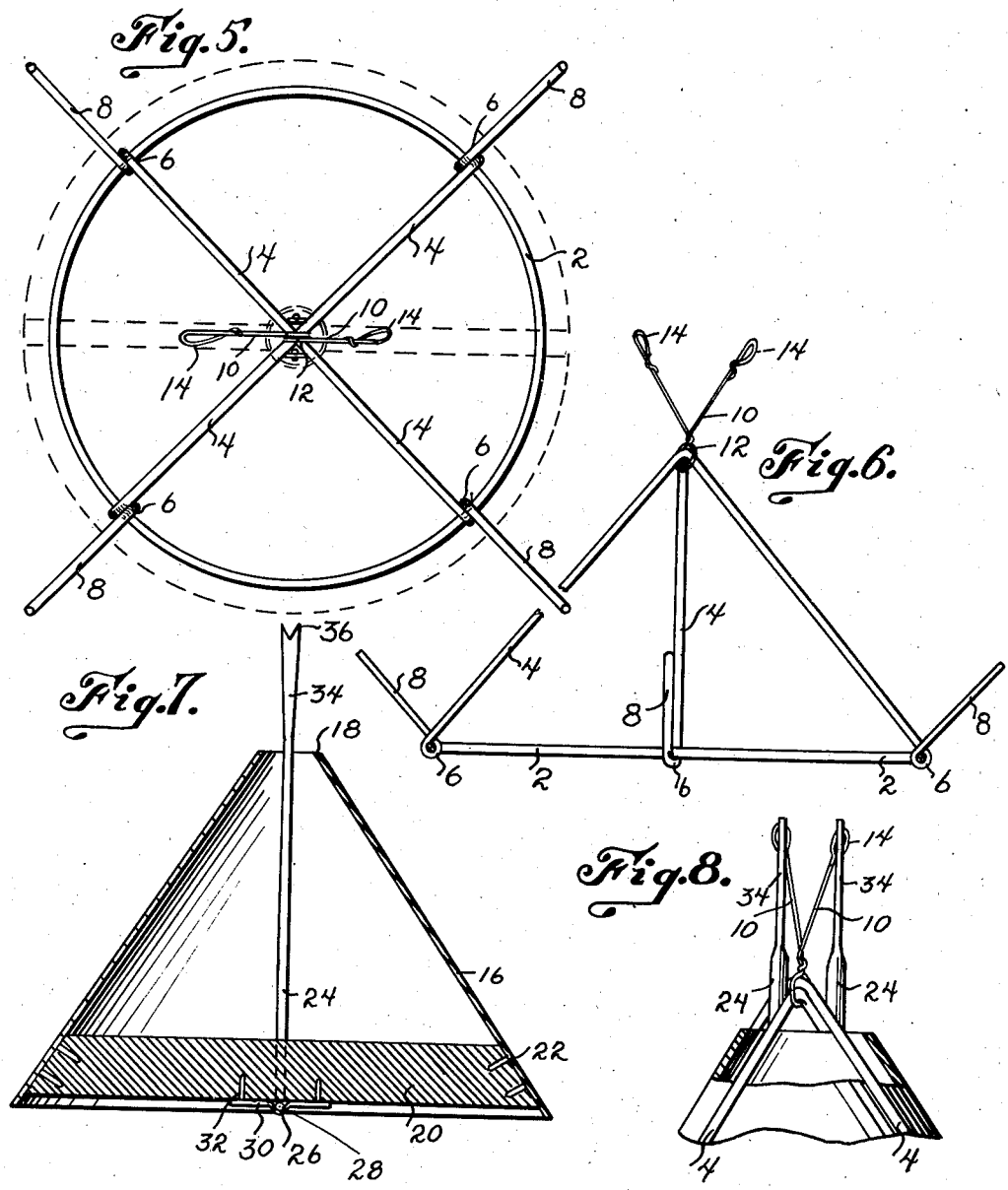
INVENTOR.
Mendal F. Regan
BY Victor J. Evans & Co.
ATTORNEYS Patented Mar. 1, 1949

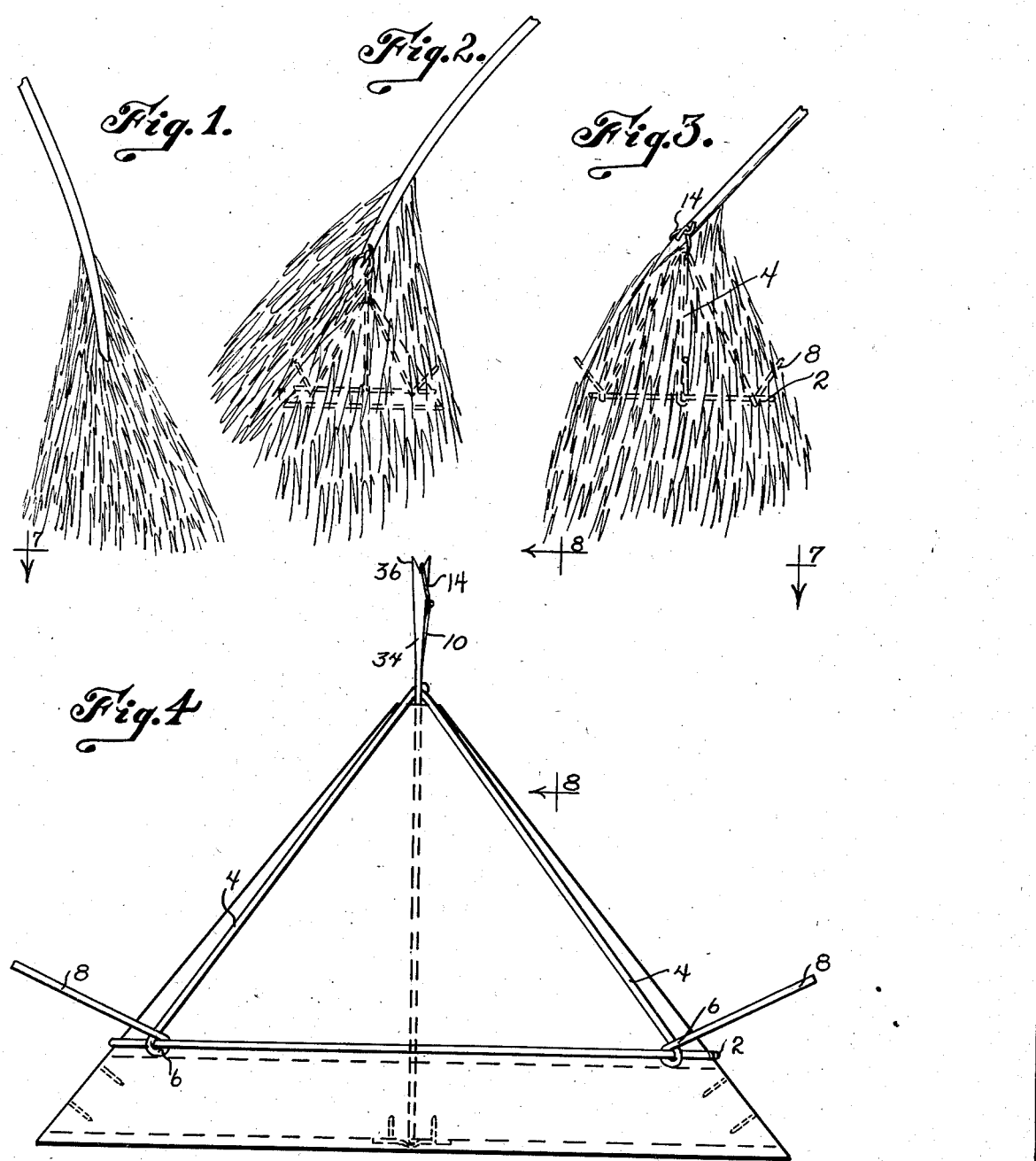

2,463,202

UNITED STATES PATENT OFFICE 2,463,202

DATE BUNCH SPREADER AND INSERTER

Mendal F. Reagan, Phoenix, Ariz.

Application June 12, 1946, Serial No. 676,207

2 Claims. (Cl. 47—1)

My present invention relates to an improved date bunch spreader and inserter of the type especially adapted to spread and separate the ripe dates growing in bunches upon the date trees. If the ripe dates are allowed to be in contact with each other, the tendency toward spoilage is great, and in order to insure the production of a proper crop of ripe dates, the bunches must be provided with a sure means of separating the dates without injury thereto.

In the accompanying drawings I have illustrated one complete example of the physical embodiment of my invention according to the best mode I have thus far devised but it will be understood that various changes and alterations may be made in the exemplified structure within the scope of the appended claims.

In the drawings:

Figure 1 is an elevational view of a bunch of dates depending from a branch of a date tree.

Figure 2 shows the spreader and inserter of my invention in position within the date bunch.

Figure 3 shows the spreader in position in the date bunch, the inserter having been removed.

Figure 4 is a side elevational view of the assembled inserter and spreader ready for use.

Figure 5 is a top plan view of the spreader.

Figure 6 is a side elevational view thereof.

Figure 7 is a vertical sectional view of the inserter; and

Figure 8 is a detail view of the assembled inserted and spreader showing the connecting means therebetween.

Referring now to the drawings wherein like characters indicate like parts, I have illustrated the device of my invention as comprising the two elements, the spreader and the inserter.

The spreader consists in a wire ring 2 and the two V-shaped wires 4 which are looped at 6 about the ring and the ends of the wires 4 are extended as at 8 outward past the ring.

A wire hanger 10 is provided for the spreader and is looped about the apexes of the V-shaped wires as at 12, and the ends of the wire hanger 10 are formed with loops 14.

The inserter for the spreader consists in the frusto-conical element 16 open at the bottom and having a reduced opening 18 at the top. A brace 20 is disposed diametrically of the base of the cone and is secured by screws 22. A U-shaped hanger 24 is disposed with the legs on opposite sides of the brace and the connecting bar 26 is journaled as at 28 in the plate 30 secured on the brace by means of screws 32.

The upper ends of the hanger legs are flattened as at 34, and the extremities thereof are notched as at 36.

In use the spreader is placed upon the inserter and the loops 14 are attached into the notches 36 whereupon the assembled structure is gently pushed upward into a bunch of dates growing on the tree, and the loops 14 are detached from the notched ends of the hanger legs and the loops and then tied to the branch from which the dates hang. The inserter may then be lowered from within the spreader frame, and if necessary the dates are evenly disposed about the spreader frame the extended ends 8 of the V-shaped wires serving to maintain the spread dates from circumferential movement about the frame.

By the use of this structure of my invention, the dates may be separated and maintained in separated condition without damage to the dates, and spoilage of the ripe dates will be prevented where such spoilage is due to the contact of the fruit with other dates.

Having thus fully described my invention what I claim as new and desire to secure by Letters Patent is:

1. The combination with a date bunch spreader comprising a conical wire frame adapted to be inserted into a bunch of dates and having radial extensions, a wire secured to the frame and formed with end loops, of an inserter for the frame, a pair of notched arms on the inserter engaging the end loops whereby the loops are maintained in position for tying to the branch of the tree carrying the date bunch to be spread.

2. The combination with a date bunch spreader comprising a conical wire frame adapted to be inserted into a bunch of dates, diametrical extensions on the frame for maintaining the dates in circumferential position about the frame, an attaching wire located at the apex of the cone and formed with end loops, of a frusto-conical inserter for the spreader, a pair of notched arms pivotally secured to the inserter and extending upwardly through the open top of the frusto-conical spreader engaging the end loops whereby the end loops are maintained in position for tying to the branch of the tree carrying the date bunch to be spread.

MENDAL F. REAGAN.

REFERENCES CITED

The following references are of record in the file of this patent:

UNITED STATES PATENTS

| Number | Name | Date |
|---|---|---|
| 946,897 | Freeman | Jan. 18, 1910 |
| 2,063,822 | Muller | Dec. 8, 1936 |